United States Patent [19]
Goodwin

[11] 3,787,337
[45] Jan. 22, 1974

[54] WHOLE PROTEIN SHAMPOO COMPOSITION
[75] Inventor: William D. Goodwin, Decatur, Ga.
[73] Assignee: The Athlon Corporation, Atlanta, Ga.
[22] Filed: Oct. 22, 1971
[21] Appl. No.: 191,780

[52] U.S. Cl............... 252/545, 8/94.1 R, 252/89, 252/312, 252/354, 252/548, 252/DIG. 13, 260/123.7, 424/70
[51] Int. Cl............................................. C11d 1/20
[58] Field of Search ... 252/544, 545, 548, 132, 354, 252/356, 312, 89, DIG. 5, DIG. 13, DIG. 14; 424/70; 8/94.1 R; 260/123.7

[56] References Cited
UNITED STATES PATENTS
2,447,860   8/1948   Jones et al...................... 260/123.7

OTHER PUBLICATIONS

Protein Derived Detergents, Soap and Chemical Specialties, May 1963, Riso, pp. 82–84, 151, 153, 155, 157 and 158.

The Chemical Formulary, H. Bennett, 1968, p. 123.

*Primary Examiner*—Herbert B. Guynn
*Assistant Examiner*—Bruce H. Hess
*Attorney, Agent, or Firm*—Edmund M. Jaskiewicz

[57] ABSTRACT

A shampoo is prepared by incorporating into a shampoo base a whole protein composition obtained by solubilization of a keratin protein material particularly chicken feathers, and an alkanolamine, such as triethanolamine, or with N,N-dimethylformamide, and a surfactant.

11 Claims, No Drawings

WHOLE PROTEIN SHAMPOO COMPOSITION

BACKGROUND OF THE INVENTION

It has long been recognized that a shampoo should possess not only adequate cleansing action on the hair and scalp, but should also leave the hair in manageable and attractive condition. The use of proteinaceous additives in shampoos is well known in the prior art, but the additives which have been proposed heretofore for this purpose have all been protein hydrolysates, such as, for example, those derived from collagen protein. This type of protein represents a material foreign to the keratinaceous protein of the hair. Moreover, there is no relationship between the peptide units present in collagen and those occurring in hair itself. Accordingly, what has been lacking has been a protein type additive which would be analogous in composition to hair itself and which would retain the primary and secondary states of the natural protein from which it is derived, rather than be composed of hydrolysis or degradation products.

GENERAL DESCRIPTION OF THE INVENTION

In accordance with the present invention, there is provided a novel whole protein composition adapted for incorporation into a shampoo base, and a novel shampoo composition prepared therefrom.

The whole protein additive of the invention is composed of components of keratinaceous materials soluble in either N,N-dimethylformamide, or in an alkanolamine, such as triethanolamine.

The solubilized protein represents an unhydrolyzed product, in which the keratin proteins which are extractable retain their original undegraded condition. The whole protein is combined with suitable surfactants, emollients, perfumes, and other conventional shampoo ingredients to provide novel shampoo compositions which are more beneficial to the hair than those known heretofore. The whole protein additive of the invention is capable of supplying nutrients analogous in composition to the keratinaceous hair protein itself.

A source of keratinaceous protein which has proved especially suitable for the purposes of the invention is avian feathers. It is known to hydrolyze keratinaceous materials such as poultry feathers and the like by the use of alkalis such as strontium hydroxide, to produce a hydrolysate having a high content of the amino acids cystine, tyrosine and tryptophane, which is said to be suitable for cosmetic use, and a process of this type is disclosed, for example, in U.S. Pat. No. 1,974,544. It is also known to extract water soluble materials from a keratin structure such as animal horns, hair, hoofs, and the like, using various water-miscible polar solvents including alcohols and ketones, to obtain extracts adapted for topical use on human skin.

The poultry processing industry operates on a scale which results in the production of large tonnages of by-product keratinaceous materials, principally feathers, which are sold as feather meal. The present invention provides a new use for this by-product material. While feathers of various domestic fowl, such as chickens, ducks, and turkeys may be used, the invention will be described with regard to the treatment of chicken feathers, it being understood that its scope is not to be considered as limited thereby.

In accordance with the invention, a whole protein composition suitable as an ingredient of shampoos is obtained from avian keratinaceous material, such as chicken feathers, with an alkanolamine or with N,N-dimethylformamide or an aqueous solution thereof, for a sufficient time to solubilize and extract a whole protein composition therefrom, and then separating the protein extract from the insoluble residue, and recovering the protein composition from the extract.

N,N-dimethylformamide (DMF) is a liquid, b. pt. 153°C., sp. gr. 0.945, which is miscible with water, and has been used heretofore principally as a solvent for polymeric materials. So far as known, it has not been used, prior to the present invention, as a medium for the solubilization of proteinaceous materials. In fact, both casein and gelatin are reported to be insoluble in DMF.

The alkanolamines which may also be employed as solubilizers for keratinaceous materials include the ethanolamines, examples of which are monoethanolamine, diethanolamine, and triethanolamine. Triethanolamine (TEA) is preferred. This compound is a liquid, b. pt. 360°C., sp. gr. 1.126. Aqueous solutions of the alkanolamines may also be employed.

It was both surprising and unexpected to discover that dimethylforamide and triethanolamine and their aqueous solutions act as a solvent for the protein of avian feathers, to yield a whole protein which is of value as an ingredient of shampoos.

Either the DMF or the TEA may be employed in 100% concentration, or in admixture with water. In the case of the DMF, the aqueous solution should contain not less than about 75% DMF by weight. The ethanolamines are preferably employed without dilution.

The proportion of extractant to feathers will ordinarily range between about 15 and about 30 parts DMF (100% basis) per part of feathers, by weight. For the ethanolamines, the proportion ranges between about 150 and about 300 parts by weight of feathers per 1,000 parts ethanolamine by volume.

While whole feathers and their associated parts, including quill portions, may be treated in their removed condition, advantageously the feathers including quill portions are crushed prior to contacting them with the DMF or DMF solution, or the ethanolamine.

The solubilization may be performed at atmospheric or superatmospheric pressure, but preferably it is carried out at atmospheric pressure. The temperature of the extraction will generally correspond to the chosen pressure, but for the purposes of the invention, the extraction is preferably carried out by contacting the feathers with boiling DMF or DMF solution or with an ethanolamine at elevated temperature usually below the boiling point, at atmospheric pressure. Advantageously this is done by introducing the feathers, which may be crushed, into a body of the solvent, in a vessel equipped with a reflux condenser.

The treatment time will depend upon the nature of the feathers, the concentration of the extractant, and the extent to which the solvation is to be carried, as well as the usual parameters of temperature and pressure. In general the time is of the order of about 4 to 8 hours, although the time can be extended to 20 hours or more. However, such extended treatment periods do not significantly increase the yield of extracted proteinaceous component, and thus the time interval chosen depends upon economic considerations. The use of aqueous DMF solutions may be preferable to that of pure DMF, since the latter may sometimes furnish a product slightly darker in color.

When the solubilization step is complete, the hot solution is separated from the insoluble feather material by any suitable method, as by filtration or centrifuging. The clarified solution is cooled to ambient temperature, and forms a gel.

The insoluble residue may be further extracted with the solvent to obtain additional protein.

The process of solubilization of the avian feather proteins, in accordance with the invention, is to be distinguished from hydrolyses, such as those known heretofore. The process of the invention results in the production of a whole protein. While not wishing to be bound by any particular theory, it is believed that in the treatment with dimethylformamide or an ethanolamine, the keratinaceous constituents of the feathers, which possess a quaternary structure are broken up to relieve the stresses in the long chain molecules. In the keratinaceous state, the quaternary structure of the protein is due largely to secondary valence bond forces. Compared with a primary valence bond these secondary forces are individually extremely weak but they are nevertheless significant because of the large number present. Breaking these secondary valence forces results in loss of quaternary structure resulting in solubilization. The direct production or even destruction of amino acids which is characteristic of acid or alkaline hydrolytic treatments is thus avoided or minimized by the use of extracts of the invention, whereby a whole protein product representing only a break-up of long chain molecules is obtained.

The protein can be extracted and altered from keratinaceous tissues by a number of applications of the DMF solvent by progressively longer periods of refluxing and/or progressively higher temperatures. Each successive extraction yields protein of lower gelling strength and viscosity. Since a higher proportion of protein is extracted in the early treatment of the keratin the proportion of high protein value is much greater than in the later treatments.

A typical analysis of the dried whole protein, as obtained from chicken feathers in terms of amino acid equivalents, is as follows:

AMINO ACID ANALYSIS OF PROTEIN COMPOSITION

| Amino Acid | uM/mg Protein*[1] | % Amino Acid in Protein |
|---|---|---|
| Aspartic Acid | 0.358 | 4.76 |
| Threonine | 0.345 | 4.11 |
| Serine | 1.292 | 13.57 |
| Proline | 0.875 | 1.01 |
| Glutamic Acid | 0.624 | 9.18 |
| Glycine | 1.008 | 7.57 |
| Alanine | 0.411 | 3.66 |
| Valine | 0.618 | 7.24 |
| Cystine | 0.088 | 2.11 |
| Methionine | 0.017 | 0.025 |
| Isoleucine | 0.376 | 4.93 |
| Leucine | 0.570 | 7.48 |
| Tyrosine | 0.102 | 1.85 |
| Phenylalanine | 0.267 | 4.11 |
| Lysine | 0.039 | 0.57 |
| Histidine | 0.001 | 0.016 |
| Arginine | 0.377 | 6.57 |

*Based on sample as 100% protein
[1]Micro mole per milligram of protein

In accordance with one aspect of the invention, the whole protein obtained by cooling of the clarified N,N-dimethylformamide (DMF) extract may be dried by any suitable means, recovering the solvent, which is then recycled. The recovered whole protein material may be subsequently admixed with surfactants and other ingredients to form a shampoo. In such case, the solution is concentrated by evaporating the solvent to a point where the protein content reaches 65% by weight or higher. Care must be exercised to avoid overheating as the solvent content approaches minimal values. The protein may be dried by spray drying technique by passing the material under pressure through a tungsten discharge nozzle into a stainless steel chamber maintained at atmospheric pressure, into which dry air is introduced at a temperature of about 400°F, the air being withdrawn from the chamber at about 240°F, but these temperatures are merely illustrative, and may be varied within wide limits. This drying step also serves to volatilize the solvent which is condensed and recovered. The proteinaceous product is a dry powder without any vestige of DMF, light in color, having a particle size averaging about 2 mils or slightly larger, the particles being crystalline in appearance. The product has a pH of about 7 and is nontoxic.

Another method of drying employs drum dryers or flakers whereby the product is fed between two heated drums rotating in opposite directions such that the wetted surfaces display their evaporating film coating on the periphery of the drums untouched until reaching the stripping blades where the dried film is removed in the form of flakes.

In accordance with a preferred aspect of the invention, the whole protein product is not separated and dried, however, but is allowed to remain in the solvent in the form of a concentrated solution, but in a form capable of being admixed with or combined with a surfactant, and/or other shampoo ingredients to provide a shampoo base.

In the case of DMF extract, a detergent or surfactant material is added with vigorous agitation to provide desirable properties of sudsing or lathering, viscosity, and protein buffering.

Alternatively, and particularly in the case of an ethanolamine extract, an anionic component may be added which will react with the ethanolamine present to form an ethanolamine salt having detergent or surfactant properties. Thus, for example, a compound having detergent properties, such as lauryl hydrogen sulfate, may be added to a triethanolamine extract until the solution has been neutralized, thereby forming the surfactant triethanolamine lauryl sulfate in situ, the whole protein component remaining in solution, to form a shampoo base of completely novel character. The same type of reaction may be utilized to form surfactants in the solution with the acidic components of other anion-active detergent components. The concentration may be adjusted to correspond with the amount of the ethanolamine solvent which remains in the extract, and will generally be between about 1% and about 10% of surfactant by weight.

Where the surfactant is not formed in situ, but is to be added to the whole protein ingredient of the shampoo, the blending of the ingredients may take place in accordance with conventional shampoo preparation practice. The surfactants may be cation-active, such as quaternary ammonium salts and esters, for example, stearyl trimethyl ammonium chloride, coco dimethyl benzyl ammonium chloride, and the like; or anion-active, such as sodium lauryl sulfate; or nonionic, such as polyoxyethylene sorbitan mono-oleate, polyoxyethylene glycol monopalmitate, and the like.

If desired the shampoo of the invention may be prepared in pressurized emulsion or aerosol form, using a pressurized gas such as nitrous oxide, or a fluorinated hydrocarbon such as dichlorodifluoromethane as a propellant.

DESCRIPTION OF THE PREFERRED EMBODIMENTS

The following examples illustrate the practice of the invention, but are not to be regarded as limiting:

EXAMPLE 1

One hundred fifty g of chicken feathers, 1,500 ml N,N-dimethylformamide and 500 ml water are refluxed at 100°C for 20 hours in a threenecked flask equipped with a reflux condenser at atmospheric pressure. Insoluble feather material is separated from the hot reaction mixture by filtration. The clarified solution is evaporated to a volume of 275 ml, forming a concentrate having a protein content of 65% by weight, equivalent to a yield of 82%, representing the removal of virtually all the DMF originally present. Sodium lauryl sulfate surfactant in an amount of about 15g (400 ml aqueous solution) is added to the hot protein concentrate with vigorous stirring. Perfume, coloring, and preservatives are then added in conventional amounts to yield a liquid shampoo, e.g., 0.15 part preservative, 0.05 part coloring, and 0.5 part perfume.

EXAMPLE 2

One thousand fifty ml triethanolamine are added to a one liter, three neck flask equipped with reflux condenser, gas inlet tube and stirrer. The TEA is heated to 170°C under a nitrogen atmosphere to retard oxidation. 175 g chicken feathers are added in 25 g portions over a period of 1 hour. The solution is then heated for a period of 4 hours at 170°C after which time there was no evidence of insoluble material. The solution is then filtered while hot to remove any possible extraneous matter and allowed to cool, yielding a brown viscous product having a pH 9.3, suitable for the preparation of a shampoo base.

Three hundred ml of the material thus obtained is diluted with 50 ml water. The pH is adjusted to 7.5 by the addition of lauryl hydrogen sulfate in a fine stream with constant stirring and cooling. On standing for 10 hours the solution becomes quite viscous and free from cloudiness. The product is suitable as a shampoo concentrate and can be diluted with water to yield a high lathering, nonirritating shampoo which has excellent cleansing properties.

EXAMPLE 3

Two hundred ml diethanolamine are added to a 1 liter, 3 necked flask equipped with reflux condenser and thermometer and heated to 140°C. 75 g crushed chicken feathers are added in 25 g portions over a period of 2 hours. The mixture is then maintained at a temperature of 135°–145°C for 2 hours. The resulting hot brown viscous liquid is filtered through a cotton pad. The refractive index of the final solution is 1.493 at 25°C. The solution represents a concentration of 27% w/v based on complete solubilization of the feathers. A higher concentration becomes progressively more difficult to filter. The product is worked into a shampoo base as described in Example 2.

What is claimed is:

1. An aqueous shampoo composition consisting essentially of a whole undegraded protein component of avian feathers sufficient to impart manageability to hair, said protein component being extracted by N,N-dimethylformamide, a detergent surfactant selected from the group consisting of a cation-active surfactant, a anion-active surfactant and a nonionic surfactant to provide sudsing or lathering properties, and water.

2. The composition of claim 1 in which the avian feathers are poultry feathers.

3. The composition of claim 1 in which the avian feathers are chicken feathers.

4. An aqueous shampoo composition consisting essentially of a whole undegraded protein component of avian feathers sufficient to impart manageability to hair, said protein component being soluble in a member selected from the group consisting of an ethanolamine and N,N-dimethylformamide, a detergent surfactant selected from the group consisting of a cation-active surfactant, a anion-active surfactant and a nonionic surfactant to provide sudsing or lathering properties, and water.

5. The composition of claim 4, in which the avian feathers are poultry feathers.

6. The composition of claim 4 in which the avian feathers are chicken feathers.

7. The composition of claim 4 in which the ethanolamine is triethanolamine.

8. The composition of claim 4 in which the surfactant is triethanolamine lauryl sulfate.

9. Method for the preparation of a shampoo concentrate comprising the steps of treating avian feathers with a solubilizing agent selected from the group consisting of an ethanolamine and N,N-dimethylformamide at boiling temperature for a period of time sufficient to solubilize and extract a whole undegraded protein component therefrom, the proportion of extractant to feathers ranging generally between 15 and 30 parts DMF per part feathers by weight and between about 150 and 300 parts by weight of feathers per 1000 parts ethanolamine by volume, separating the protein-containing solution from the insoluble residue, and adding an effective amount of a surfactant to the solution which surfactant is selected from the group consisting of a cation-active surfactant, an anion-active surfactant and a nonionic surfactant to provide sudsing or lathering properties.

10. The method of claim 9 in which the solubilizing agent is an ethanolamine and the surfactant is lauryl hydrogen sulfate.

11. The method of claim 10 in which the ethanolamine is triethanolamine.

\* \* \* \* \*